United States Patent [19]

Miyakawa et al.

[11] 4,430,223
[45] Feb. 7, 1984

[54] FILTER ELEMENT FOR FILTERING FLUID AND METHOD OF PRODUCING SAME

[75] Inventors: Susumu Miyakawa, Kariya; Toshiaki Fukuta; Hajime Akado, both of Anjo; Yoshihiro Taki, Nagoya, all of Japan

[73] Assignee: Nippondenso Co., Ltd., Kariya, Japan

[21] Appl. No.: 350,146

[22] Filed: Feb. 19, 1982

[30] Foreign Application Priority Data

| Feb. 25, 1981 | [JP] | Japan | 56-27242 |
| Mar. 6, 1981 | [JP] | Japan | 56-32861 |
| Mar. 6, 1981 | [JP] | Japan | 56-32862 |
| Jul. 10, 1981 | [JP] | Japan | 56-108705 |
| Oct. 28, 1981 | [JP] | Japan | 56-172428 |
| Dec. 11, 1981 | [JP] | Japan | 56-200678 |

[51] Int. Cl.³ .................. B01D 27/06; B01D 46/52
[52] U.S. Cl. ..................... 210/493.5; 210/497.01; 55/498; 55/521
[58] Field of Search ............... 210/493.3, 493.4, 493.5, 210/494, 497.2, 497.1, 497.01; 55/132, 498, 521, 524, 529

[56] References Cited

U.S. PATENT DOCUMENTS 4,093,437 6/1978 Ichihara et al. .................... 55/524

FOREIGN PATENT DOCUMENTS

| 728093 | 11/1942 | Fed. Rep. of Germany | 55/521 |
| 883049 | 6/1943 | France | 55/521 |

Primary Examiner—Peter A. Hruskoci
Assistant Examiner—Wanda L. Millard
Attorney, Agent, or Firm—Cushman, Darby & Cushman

[57] ABSTRACT

A filter element of the cylindrical shape for filtering fluid having a constructional form including two-dimensional wave forms radially spreading from the axis of the cylindrical filter element in the form of annular rings, to allow the fluid to flow axially of the filter element. The filter element is produced by using a sheet of filter material in the form of a trapezoid or a segment.

7 Claims, 52 Drawing Figures

FILTER ELEMENT FOR FILTERING FLUID AND METHOD OF PRODUCING SAME

FIELD OF THE INVENTION

This invention relates to a fluid cleaner system provided with a filter element for filtering fluid or liquid.

DESCRIPTION OF THE PRIOR ART

Figures 1, 2, 3:
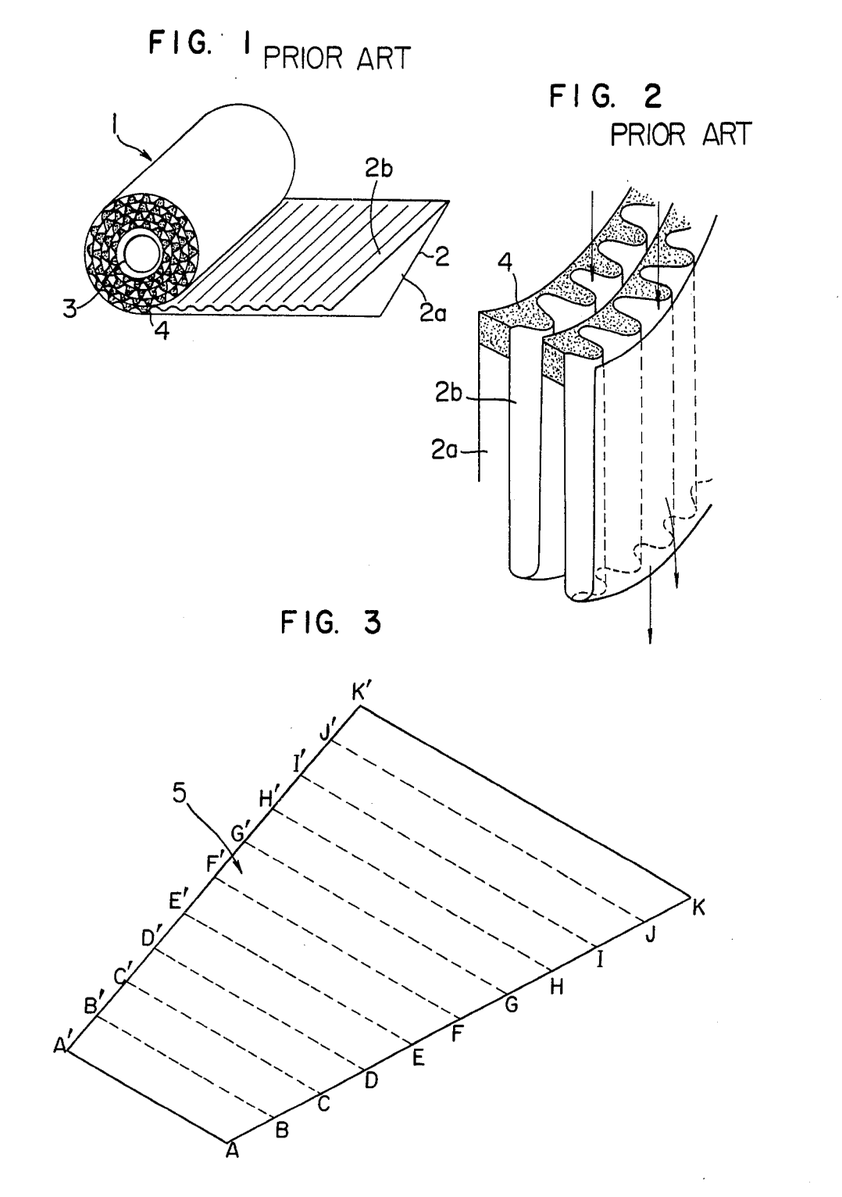
FIG. 1 is a perspective view of filter material of the prior art used for producing a filter element.
FIG. 2 is a fragmentary perspective view of the filter portion of the filter element formed by the filter material shown in FIG. 1, in explanation of the operation of the filter element of the prior art.
FIGS. 3–5 are views in explanation of the process of production of the filter element according to the invention, FIG. 3 being a developed view of the filter material, FIG. 4 being a perspective view of the filter material as bent and folded, and FIG. 5 being a perspective view of the filter element.

FIG. 1 shows a filter element of the vortical form of the prior art. The filter element 1 is formed of a filter material strip 2 including a planar portion 2a in one-half thereof and a corrugated portion 2b in the other-half thereof which are bent at the boundary and folded. Then the folded filter material strip 2 is wound about a core 3 with the corrugated portion 2b being located inside, to obtain a vortically wound strip 2. When the filter material strip 2 is wound about the core 3, the spacing between the planar portion 2a and the corrugated portion 2b of the filter material strip 2 adjacent each other near the inlet end of polluted air is filled with an adhesive agent 4 as shown in FIG. 2, to provide a seal between the two portions 2a and 2b.

In the filter element of this construction, the air flows through channels defined between the planar portion 2a and the corrugated portion 2b as indicated by arrows, and then penetrates the walls of the channels, to be cleaned in the process.

The filter element of the aforesaid construction and operation of the prior art suffers the following disadvantages:

(1) As the filter material strip 2 including the planar portion 2a and the corrugated portion 2b is bent at the boundary and folded and the folded filter material strip 2 is wound about the core 3 with the planar portion 2a located inside, the planar portion 2a has a greater length than the corrugated portion 2b, so that the former is in excess of the latter in amount. This phenomenon is marked when the diameter of the vortical filter element increases. Thus the corrugated portion 2b for avoiding the intimate contact between the adjacent two portions 2a and 2b of the folded filter material strip 2 tends to be crushed.

(2) The spacing between the planar portion 2a and the corrugated portion 2b of the filter material strip 2 adjacent each other near the inlet end of polluted air is filled with the adhesive agent. This reduces the area of the inlet side space for the polluted air to flow therethrough to about one-half that of the end surface of the inlet side space, thereby increasing the resistance offered to the passage of the air through the filter element.

(3) The use of an adhesive agent reduces the filtering area of the filter element for an amount corresponding to the thickness of the adhesive agent layers. Also, an external force exerted on the filter element 1 might cause peeling of the adhesive agent layers, thereby making it impossible to achieve satisfactory results in cleaning the air.

SUMMARY OF THE INVENTION

This invention has been developed for the purpose of obviating the aforesaid disadvantages of the prior art. Accordingly the invention has as one of its objects the provision of improvements in or relating to the filter element of the vortical form by using a filter material strip of a trapezoidal or sectorial form.

Another object is to provide a filter element of the type described for cleaning fluid in which the filter material strip has projections on one side edge and depressions on the other side edge to provide an improved connection between the two side edges when the filter material strip folded in the center is curved into a cylindrical form.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

DETAILED EXPLANATION OF THE PREFERRED EMBODIMENTS

Figure 4:
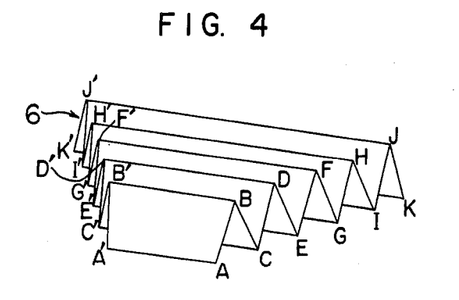
Figure 5:
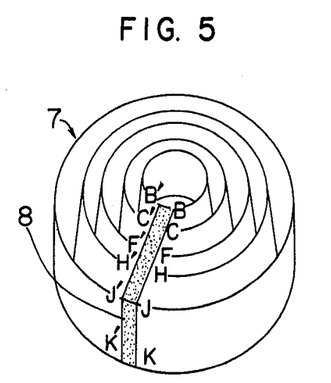

The invention will now be described in detail by referring to the preferred embodiments shown in the accompanying drawings. The filter material used for producing a filter element according to the invention is trapezoidal in form having a greater widthwise dimension at one end thereof than at the other end thereof, as shown in FIG. 3. The trapezoidal filter material 5 is folded at folding lines B-B', C-C' . . . K-K' with the same width of the folds, to provide a filter material 6 shown in FIG. 4 corrugated in cross section having a plurality of elevated portions and depressed portions located continuously between the opposite ends of the filter material. The filter material 6 is then curved, as shown in FIG. 5, into an annular form (which may be elliptic in form) with the folds of smaller width or the folds A-A', B-B' and C-C' being disposed on the inner peripheral side of the curved filter material 6. The curved filter material thus obtained is adhesively connected at the opposite ends as indicated at 8, to provide a filter element 7 of the concentric circles type.

The cylindrical filter element 7 shown in FIG. 5 may be fundamentally defined as a two-dimensional wave form, although many modifications thereof may be obtained. More specifically, the filter element may be regarded as a shape of transverse waves spreading radially from a source of vibration along a two-dimensional surface (such as planar surface, conical surface, etc.). One of the characteristics of the filter element of this type is that the crests and bottoms of the waves are annular in form. If one assumes that the velocity of the movement of the waves on the aforesaid surface is varied depending on the direction of the movement, one would admit that the various shapes of the filter element described hereinafter could be included in the category of the two-dimensional wave form.

Figure 6:
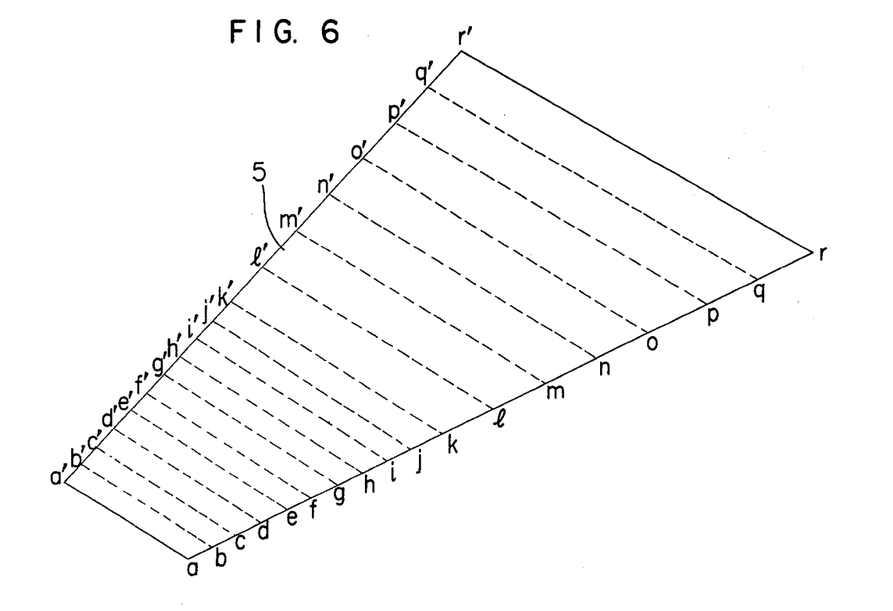
FIGS. 6–8 are views in explanation of the process of production of another form of filter element according to the invention, FIG. 6 being a developed view of the filter material, FIG. 7 being a perspective view showing the filter material of FIG. 6 in bent and folded condition, and FIG. 8 being a perspective view of another form of filter element.
Figure 7:
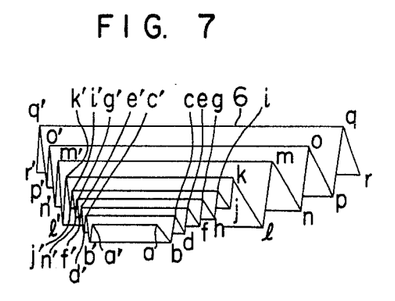
Figure 8:
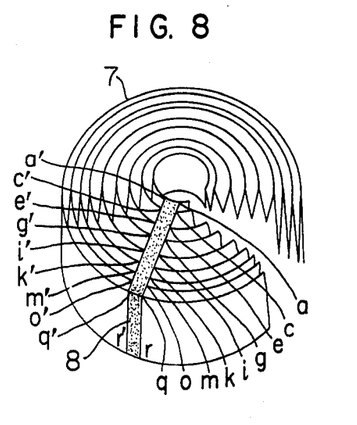

FIGS. 6–8 show the process of production of another form of filter element, in which folds a-a' to k-k' have a smaller width than other folds, so that corrugations a-b, a'-b' . . . i-j, i'-j' have a height smaller than corrugations k-l, k'-l' . . . q-r, q'-r' as shown in FIG. 7. The filter element of this form is also produced by folding the filter material and curving same with the folds of the smaller width being located on the inner peripheral side of the curved filter material 6 and then adhesively connecting the opposite ends as indicated at 8, to produce a filter element of the concentric circles type 7.

Figure 9:
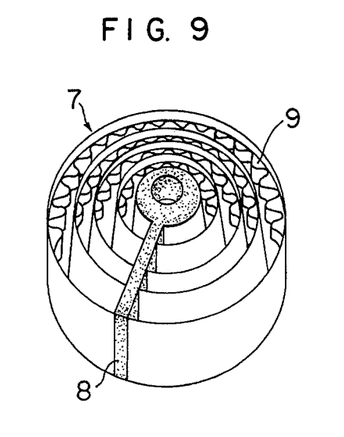
FIGS. 9 and 10 are perspective views of other forms of filter element.

In FIG. 9, a spacer 9 of the wave form is interposed between folds of the filter element 7 shown in FIG. 5, to avoid intimate contact between the folds of the filter material.

Figure 10:
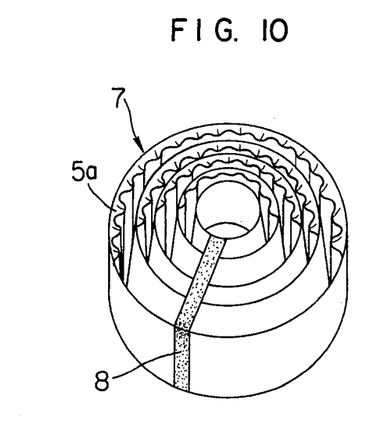

In FIG. 10, a corrugation 5a is attached to a filter material strip 5 shown in FIG. 3 at every other folds. This modification also has the effect of avoiding intimate contact between the folds of the filter material, as is the case with the modification shown in FIG. 9.

Figure 11:
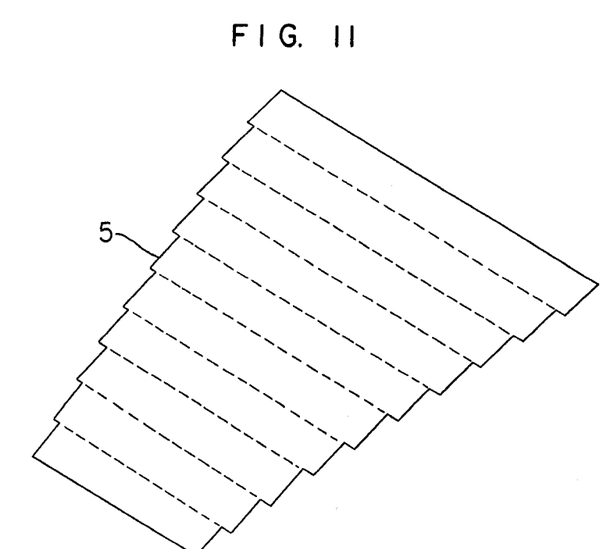
FIG. 11 is a perspective view of another form of filter material used for producing the filter element by the process shown in FIGS. 3–8.

FIG. 11 shows the filter material 5 which is stepped at opposite side edges. By using the filter material 5 of this shape, it is also possible to obtain the filter element 7 as shown in FIG. 5.

Figure 12:
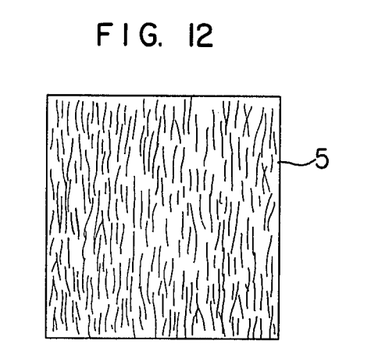
FIG. 12 is a plan view of still another form of filter material used for producing the filter element by the process shown in FIGS. 3–8.
Figure 13:
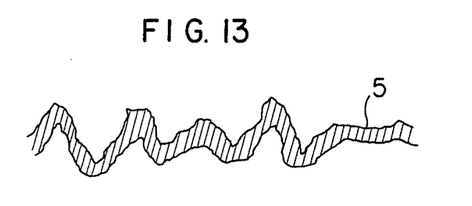
FIG. 13 is a sectional side view of the filter material shown in FIG. 12, shown in bent and folded condition.

In producing the filter element 7 shown in FIGS. 5, 8 and 9–11, the filter material 5 of the aforesaid shape is used. However, the filter material 5 may be capable of expanding and contracting as shown in FIGS. 12 and 13. More specifically, the filter material 5 shown in these figures is finely wrinkled. When the filter material 5 wrinkled as shown is bent and folded in corrugated form as shown in FIG. 4 and then curved into ring form as shown in FIG. 5, for example, the wrinkles would expand and contract on the curved surface, so that the differences in circumference between the folds due to the differences in radius can be accommodated when the filter material is curved into ring form. This is conductive to easy curving of the filter material.

The aforesaid filter element 7 has been produced in various modifications by using the filter material 5 of the trapezoidal shape. However, the invention is not limited to this specific shape of the filter material and a filter material of the segmental shape may also be used, as presently to be described.

Figure 14:
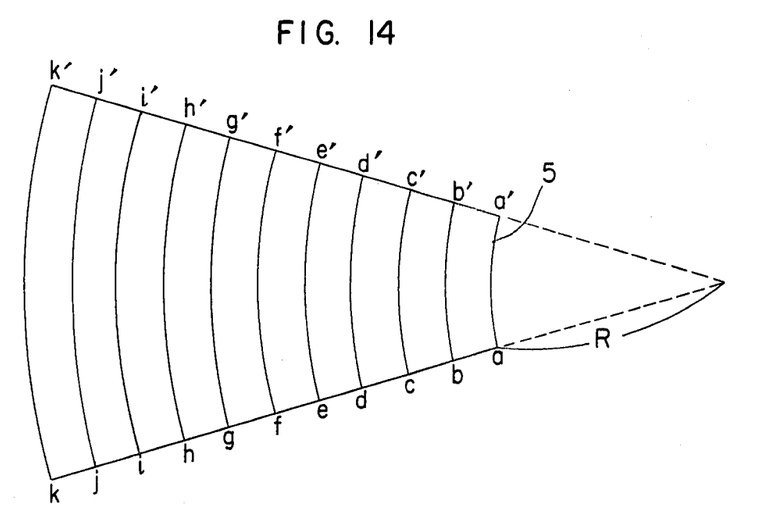
FIGS. 14–40 are views showing the process for producing other forms of filter element.
Figure 15:
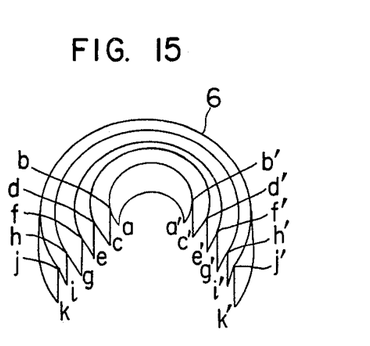
Figure 16:
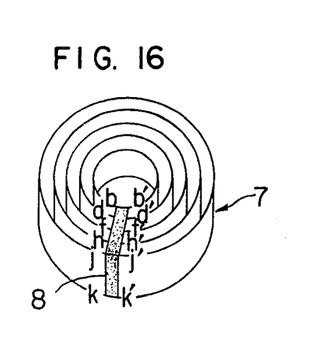

In FIGS. 14–16, the filter material 5 of the sectorial shape shown in FIG. 14 is prepared. Then arcs b-b' . . . j-j' are reinforced by using a radius r obtained from the inner diameter and the outer diameter of the filter element 7 between the short arc a-a' and the long arc k-k' by dividing the spacing equally while using the length of the short arc a-a' as the length of the inner periphery of the filter element 7 and the length of the long arc k-k' as the length of the outer periphery thereof. The filter material is bent at the arcs b-b' . . . j-j' to provide the filter material 6 shown in FIG. 15. Then the sides a . . . k of the filter material 6 are adhesively connected to the sides a' . . . j' thereof as indicated at 8, to provide the filter element of the concentric circles type 7 shown in FIG. 16.

In the filter element 7 of this construction, there is no difference in circumferential dimension between the folds of the filter element because the starting material 5 is sectorial and the folds are arcuate in shape with the arcs (such as b-b') forming an angle of 90 degrees at the edges with the filter material 5 at its opposite side edges. Thus the filter material 5 need not be able to expand and contract and filter paper, nonwoven cloth, felt, etc., may be used for it. Reinforcing of the arcs a-a', b-b' . . . j-j' may be effected by means of reinforcing rollers or by applying pressure while heating.

Figures 17, 18, 19, 20:
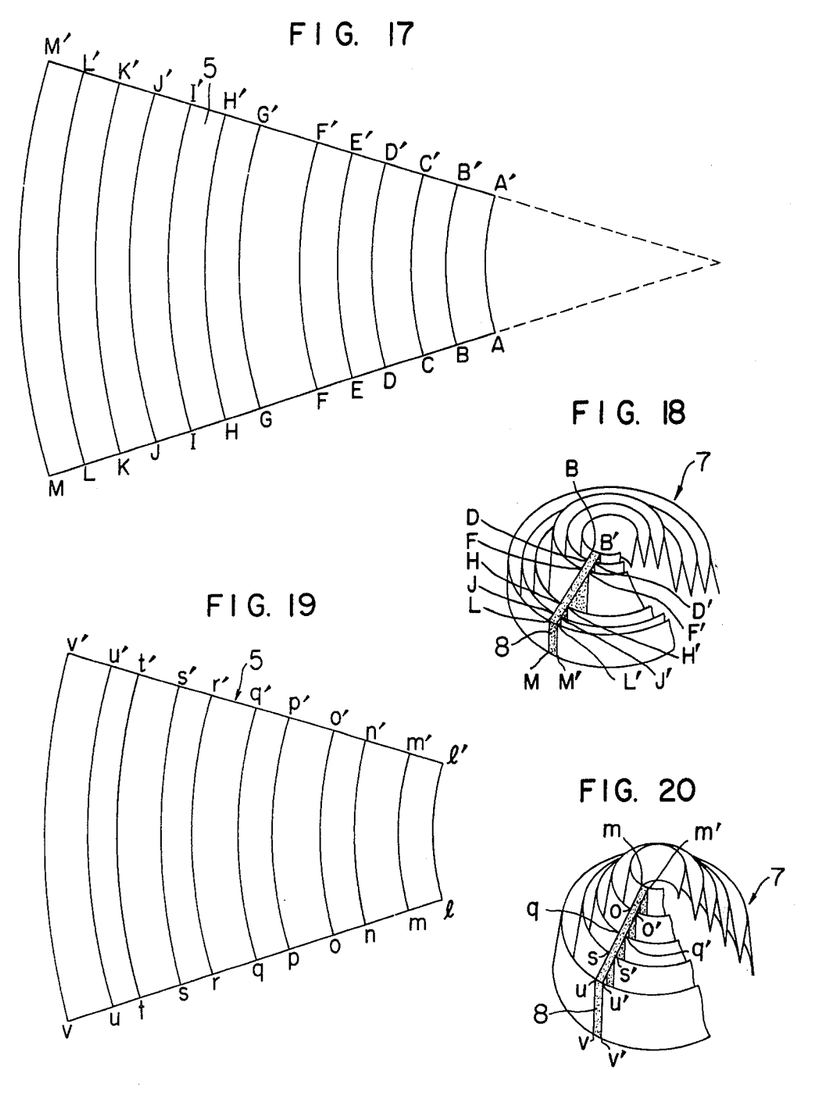

FIGS. 17 and 18 show a modification of the filter element shown in FIGS. 14–16 in which the distance between the arcs or the width of the folds are smaller in A-B, B-C . . . E-F than in F-G while the width of the folds G-H, H-I . . . L-K is equal to that of the folds A-B, B-C . . . E-F.

By using the filter material 5 of this shape, it is possible to provide a difference in level between the folds B-B', D-D' and F-F' and H-H', J-J' and I-I' as shown in FIG. 18.

FIGS. 19 and 20 show still another modification of the filter element shown in FIGS. 14–16 in which the filter material 5 used is equal in width between the arcs l-l' and m-m', n-n' and o-o', r-r' and s-s' and t-t' and u-u' and between the arcs m-m' and n-n', o-o' and p-p', q-q' and r-r', s-s' and t-t' and u-u' and v-v', the width between the arcs m-m' and n-n' . . . u-u' and v-v' being greater than the width between the arcs l-l' nd m-m' . . . t-t' and u-u'.

When the filter material 5 of the shape shown in FIG. 19 is used, the filter element 7 obtained is shaped such that the elevated portions and the depressed portions of the corrugation that are continuous are parallel to one another and downwardly inclined with respect to the axis of the filter element 7.

Figures 21, 22, 23:
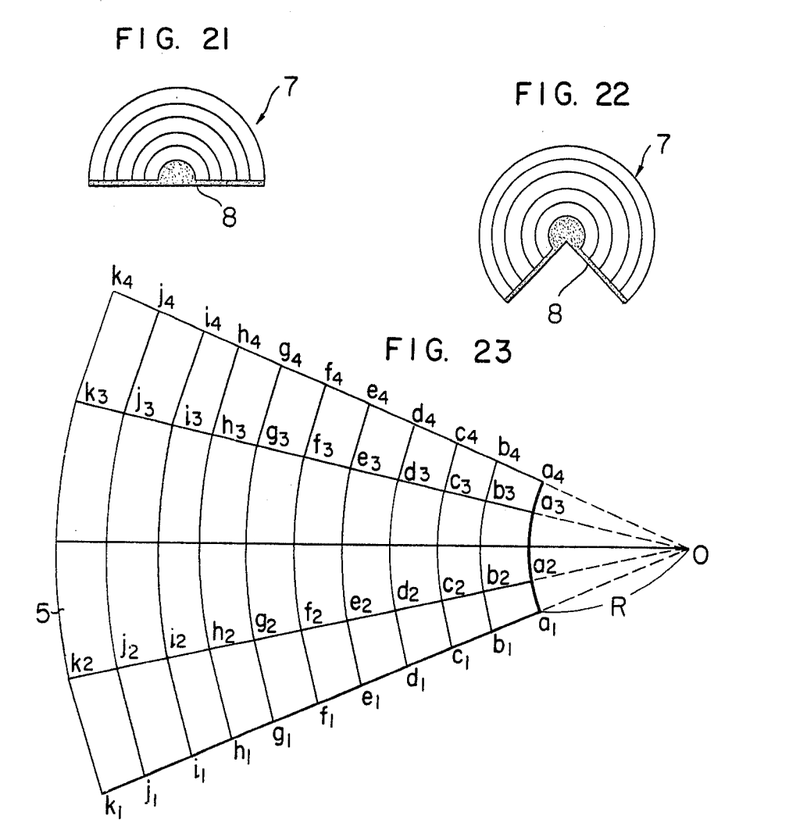

FIG. 21 shows a filter element 7 obtained by using a filter material in which the arcs a-a' ... k-k' of the filter material 5 shown in FIG. 14 have their lengths reduced to one-half. The filter element 7 obtained is semicircular in planar form and has a resin applied to its inner periphery and its end surface as indicated at 8.

FIG. 22 shows a filter element 7 obtained by reducing the length of each arc of the filter material 5 shown in FIG. 13 to three-quarters.

The various forms of filter element 7 shown and described hereinabove are of the cylindrical concentric circles type. Other forms of filter element will be described.

Figure 24:
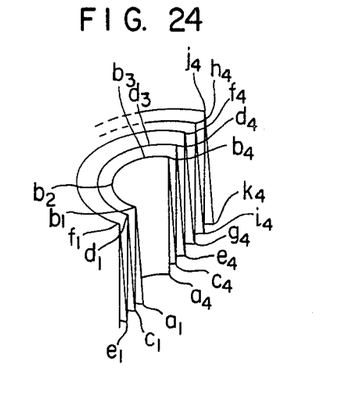
Figure 25:
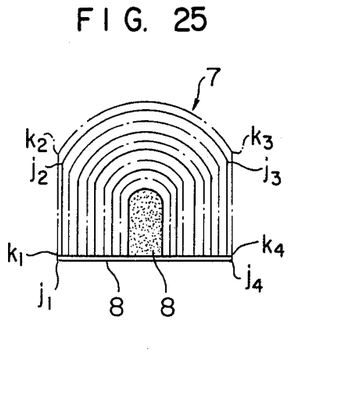

In FIGS. 23-25, the filter material 5 is sectorial in shape in planar form and has opposite ends differing from each other in length. In the sectorial filter material 5, arcuate lines $a_2-a_3$, $b_2-b_3$ ... $j_2-j_3$ are drawn with different radii from a point O serving as the center of imaginary concentric circles, and lines $a_1-a_2$, $a_3-a_4$, $b_1-b_2$, $b_3-b_4$ ... $j_1-j_2$, $j_3-j_4$, $k_1-k_2$, $k_3-k_4$ are drawn on opposite sides of the aforesaid arcuate lines.

Figure 26:
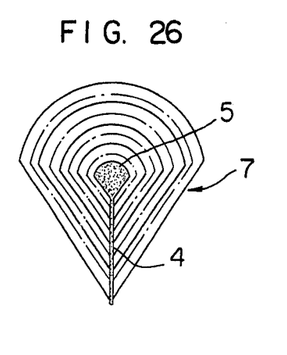

The filter material 5 is bent at the lines is corrugated form in cross section as shown in FIG. 24, and the folds are connected together between sides $a_1$, $b_1$, $c_1$ ... $k_1$ and $a_4$, $b_4$, $c_4$ ... $k_4$ with a resin as indicated at 8 to provide a filter element 7. In FIG. 25, 8' designates a core formed of resin or other nonpermeable material secured to the inner side of the filter element 7 with an adhesive agent. The filter material 5 shown in FIG. 23 may be formed into a filter element of the construction shown in FIG. 26.

Figure 27:
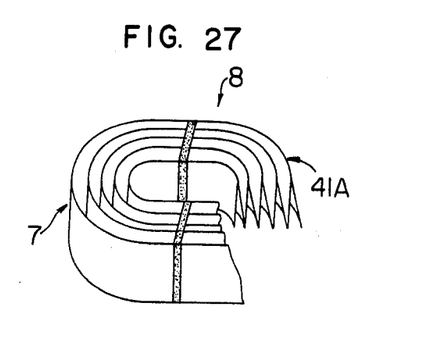

FIG. 27 shows a filter element 7 of the elliptic form obtained by using two filter elements 7 of the shape shown in FIG. 25 and connecting them together at ends by using an adhesive agent as indicated at 8.

The various forms of filter element 7 shown in FIGS. 23-27 may be modified as follows.

(1) In the filter material 5 shown in FIG. 23, lines $a_1-a_4$, $b_1-b_4$ ... $k_1-k_4$ are equidistantly spaced apart from one another. However, the spacing between the lines may, of course, be successively varied.

Figure 28:
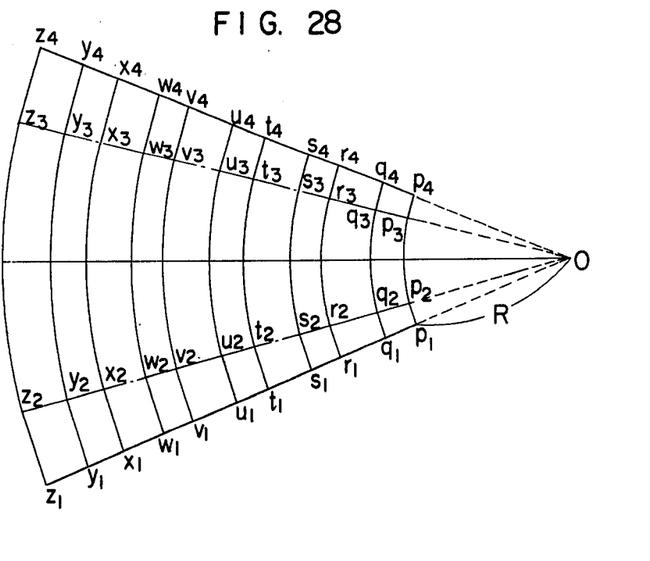

(2) As shown in FIG. 28, the spacing between the lines may be varied into two groups and the large spacing and small spacing may be alternately arranged. In the figure, lines $p_1-p_2$, $p_3-p_4$, $q_1-q_2$, $q_3-q_4$ ... $y_1-y_2$, $y_3-y_4$, $z_1-z_2$, $z_3-z_4$ are straight lines and lines $p_2-p_3$ ... $z_2-z_3$ are arcuate lines.

Figure 29:
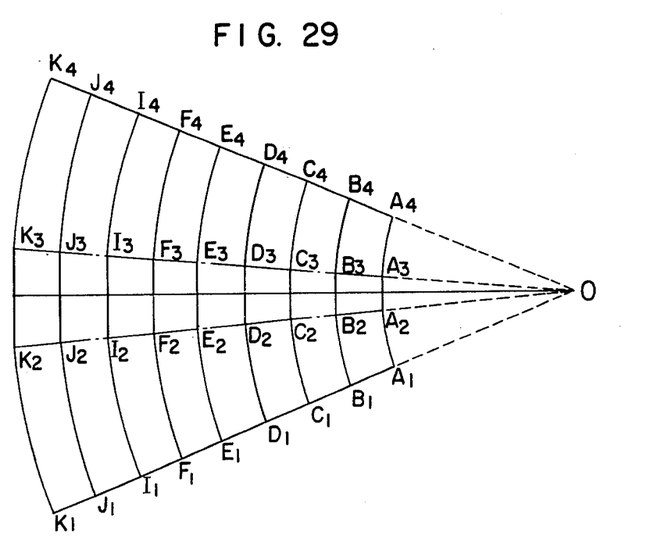

(3) As shown in FIG. 29, straight lines $A_2-A_3$ ... $K_2-K_3$ may be drawn in the central region of the filter material 5.

(4) In the filter material 5 shown in FIGS. 23, 28 and 29, the arcuate lines are centered at the same point. However, the arcuate lines may, of course, be centered at separate points.

The filter element of the eccentric type will now be described.

Figures 30, 31:
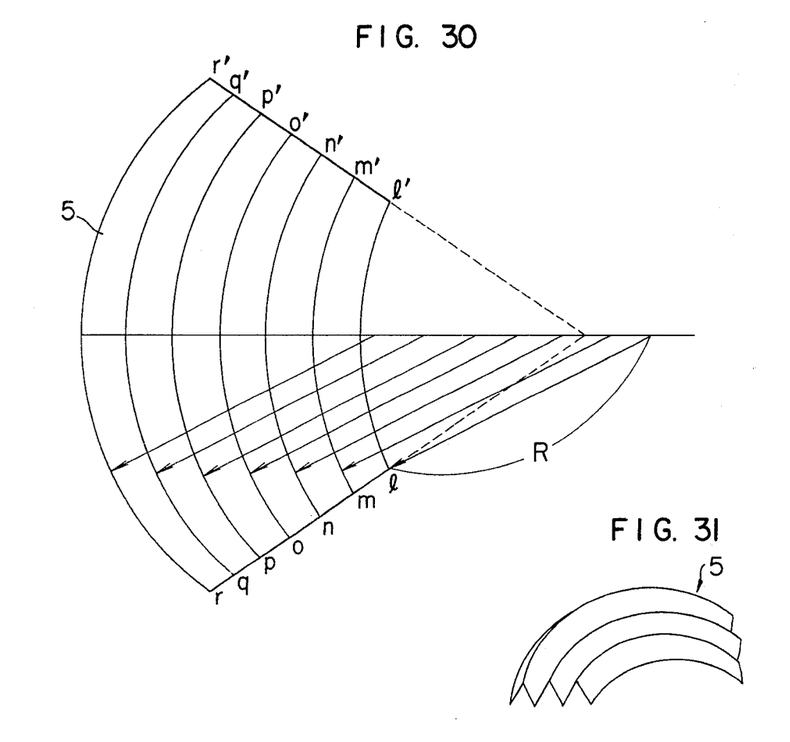

In FIGS. 30-36, the filter material 5 is sectorial in planar form and one end thereof is larger in dimension than the other end thereof, as shown in FIG. 30. A plurality of arcuate lines l-l' ... r-r' are drawn in the filter material 5 with the same radius R and from separate points serving as centers of imaginary circles which are in alignment with one another.

Figure 32:
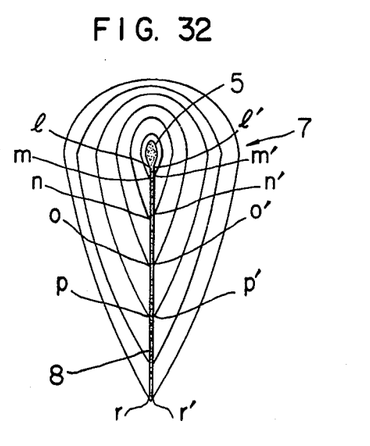
Figure 33:
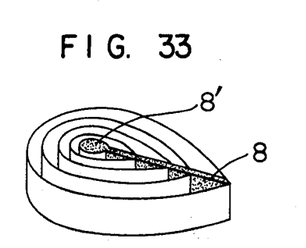

The filter material 5 formed with the arcuate lines as shown in FIG. 30 is bent, as shown in FIG. 31, at the arcuate lines in corrugated form in transverse cross section and bonded together at sides l-l' ... r-r' as shown in FIG. 32 as indicated at 8 therein, to provide a filter element 7. In the figure, 8' is a core formed of nonpermeable material, such as resin, secured to the inner side of the filter element 7 with an adhesive agent.

Figure 34:
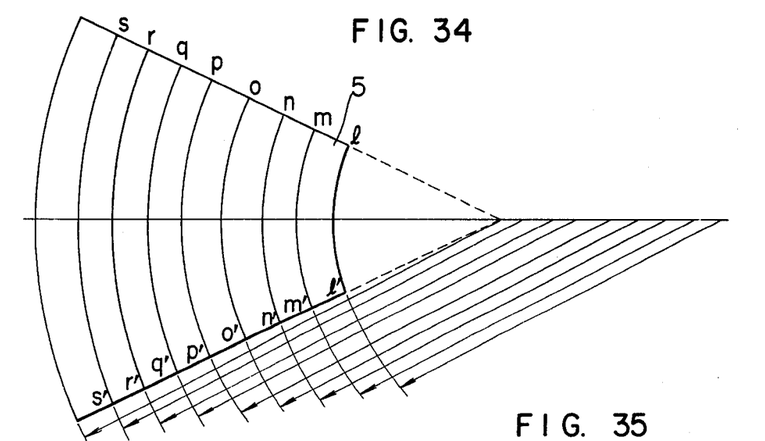
Figure 35:
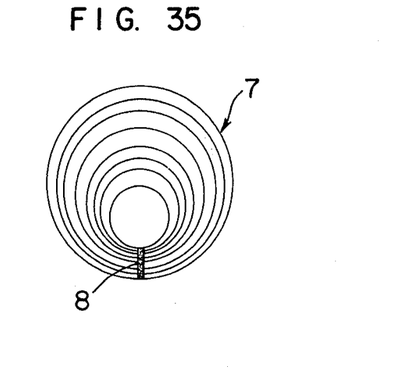

FIGS. 34 and 35 show another form of filter element 7 of the eccentric type in which the arcuate lines drawn in the filter material 5 are centered at separate points and differ from one another in radius. FIG. 35 shows the filter element 7 formed by using the filter material 5 of this construction.

In the various forms of filter element shown and described hereinabove, the filter material used is in the form of a trapezoid or a sector having its top cut off along a line parallel to its bottom. Thus the filter element obtained by using such filter material is annular in form. In the filter element of the type presently to be described, a triangular or sectorial filter material is used to provide a filter element which performs the filtering function in the central portion thereof.

Figure 36:
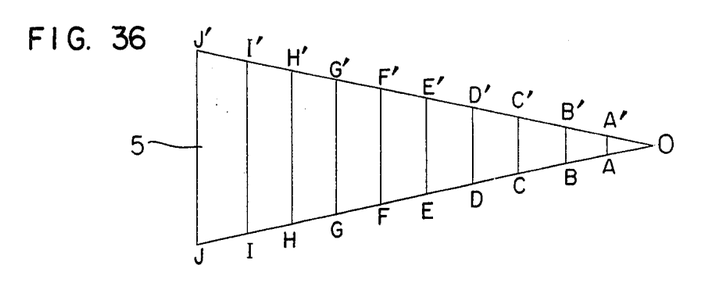
Figure 37:
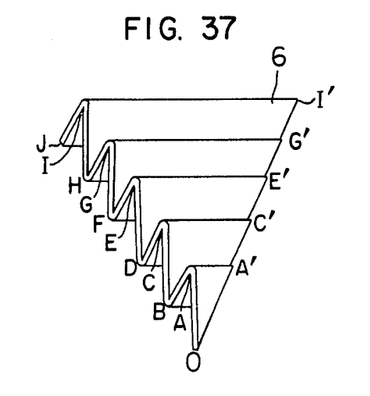
Figure 38:
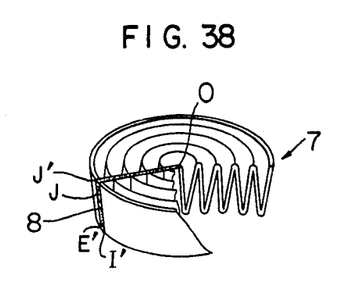

FIG. 36 shows a filter material 5 in the form of an equilateral triangle which is folded at folding lines A-A', B-B', C-C' ... J-J' equidistantly spaced apart from one another, to provide a folded filter material 6 formed with a plurality of elevations and depressions of the corrugation continuously formed in cross section between opposite sides of the filter material 5, as shown in FIG. 37. The filter material 6 of the folded form is curved into ring form (which may be elliptic) with folds A-A' and B-B' of small width being located on the inner peripheral side, and adhesively connected at opposite sides of the folds as indicated at 8 as shown in FIG. 38, to provide a filter element 7 of the concentric circles type. Attention is drawn to the fact that FIG. 36 shows a model and in actual practice the filter paper 5 has a greater bottom than is shown in the figure, to enable the folded filter material 6 to be curved into a ring form.

Various modifications may be made to the filter element shown and described by referring to FIGS. 36-38.

Figure 39:
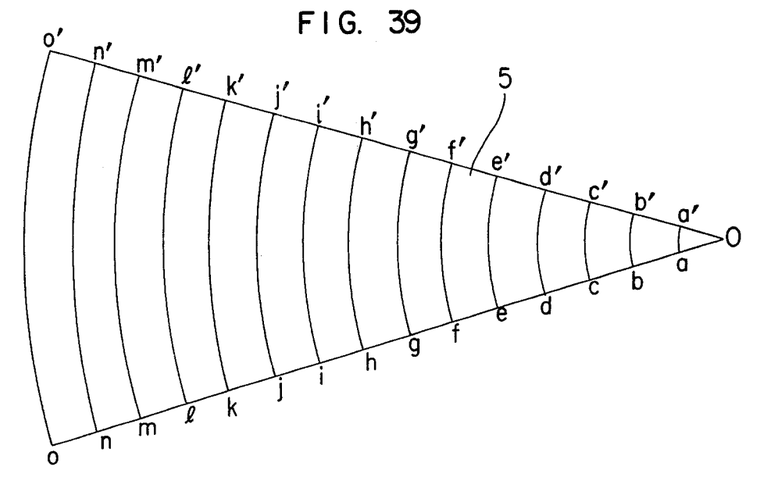

(1) The filter material 5 may, as shown in FIG. 39, be sectorial in shape and folding lines a-a' ... o-o' may be arcuate lines which form an angle of 90 degrees with side edges of the filter material 5.

Figure 40:
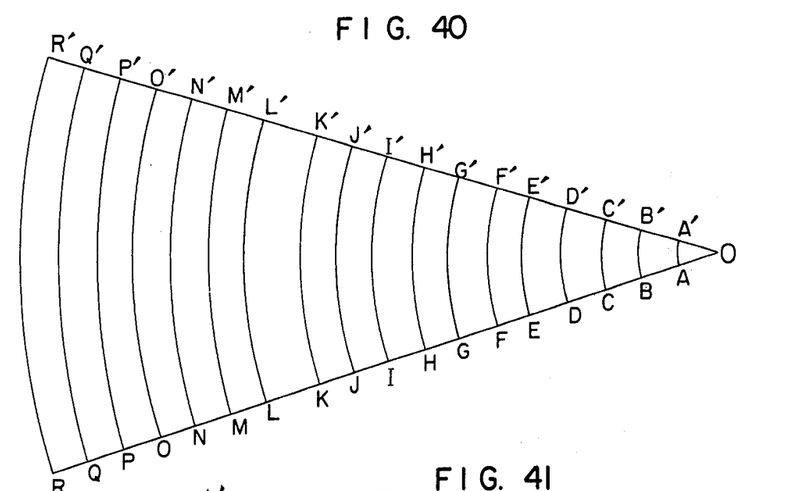

(2) The filter material 5 shown in FIG. 40 which is a modification to the filter material 5 shown in FIG. 39 may be used, in which the spacing between the arcuate lines K-K' and L-L' is distinct from the spacing between the rest of the arcuate lines. When this form of filter material is used, it is possible to provide different levels to the folds of the filter element.

(3) The filter material 5 may have another filter material distinct from the material 5 in density attached thereto to provide a filter element which may vary in density in separate portions thereof.

In the foregoing description, the filter element for use with a fluid cleaner system according to the invention has been described which is formed by using a filter material strip having a fundamental shape of a sector or a trapezoid having a smaller dimension at one end than at the other end. In forming the filter element, such filter material strip is bent and folded in such a manner that a continuous wave form can be made in longitudinal cross section between the two ends, and the folded filter material strip is curved with one end and the other end of the strip being located on the inner peripheral side and the outer peripheral side respectively of the filter element. Finally, opposite sides of the filter material strip are connected together, to provide a completed filter element. The filter element formed in this way has suffered the disadvantage that since it is formed by bending and folding a filter material strip, the force tending to restore the filter element to the original form strongly acts thereon, with the resultant tendency shown by the connection between the opposite sides of the filter material strip being undone.

Accordingly the invention has as one of its object the provision of a filter element for use with a fluid cleaner system which is formed by using a filter material strip of the aforesaid fundamental shape provided at one side edge with projections and at the other side edge with depressions to provide an improved connection between the two side edges when the folded filter material strip is curved into a cylindrical form.

Figures 41, 42, 43:
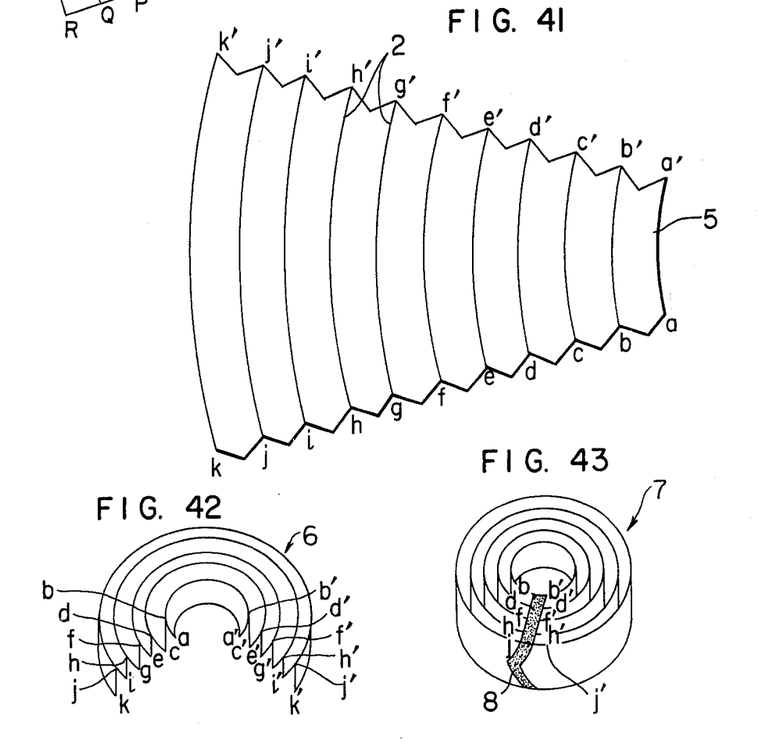
FIG. 41 is a plan view of a filter material strip for producing a filter element formed with projections at one side edge and with depressions at the other side edge to obtain an improved connection at opposite side edges.
FIG. 42 is a view of the filter material shown in FIG. 1, shown in bent and folded condition to provide a continuous wave form in cross section axially thereof, with the irregularities at opposite side edges being eliminated in the interest of brevity.
FIG. 43 is a view of the filter material shown in FIG. 42, shown in a condition in which the filter material is connected together at opposite side edges.

FIG. 41 shows a filter material strip 5 of a sectorial shape in which folding lines 2 are drawn along arcuate lines b-b', c-c' . . . and j-j' equidistantly spaced spart from one another and centered at the same point which are interposed between a shortest arcuate line a-a' at one end and a longest arcuate line k-k' at the other end. The strip 5 is formed with projections and depressions on one side edge and the other side edge respectively in such a manner that the projection on one side edge of a section between the adjacent arcuate lines a-a' and b-b', for example, and the depression on the other side edge thereof are complementary with each other.

The filter material strip 5 of this shape is bent and folded along the folding lines 2 to provide a corrugation continuously formed in longitudinal cross section as shown in FIG. 42. Then the folded filter material 6 shown in FIG. 42 is curved in such a manner that the arcuate lines a-a' and k-k' are located on the inner peripheral side and outer peripheral side respectively of a filter element 7 shown in FIG. 43, followed by connecting together the two side edges of the filter material strip 6. At this time, a connection as indicated at 8 is formed between the projections and depressions on the opposite side edges of the filter material strip 6 which provides improves connection because the area of contact is increased in the connection 8.

Figure 44:
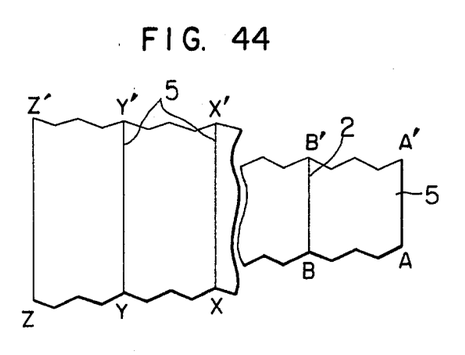
FIG. 44 is a plan view, with certain parts being omitted, of still another form of filter material according to the invention.
Figure 45:
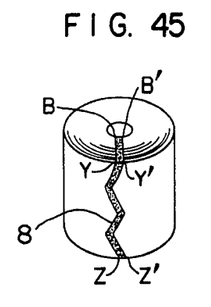
FIG. 45 is a perspective view of the filter material strip shown in FIG. 44, shown in curved condition.

FIG. 44 shows a trapezoidal filter material strip 5 formed therein with folding lines 2 equidistantly spaced apart from one another between a short end A-A' and a long end Z-Z'. In this filter material strip 5, an intermediate portion is omitted. A section of the filter material strip 5 between the adjacent folding lines 2 is formed with one elevation and two depressions at one side edge and with two elevations and one depression on the other side edge. When the filter material strip 5 is bent and curved and has its opposite side edges connected together, the filter element formed has a connection 8 which, as shown in FIG. 45, is in zigzag form, to thereby further increase the area of contact between the two side edges.

Figure 46:
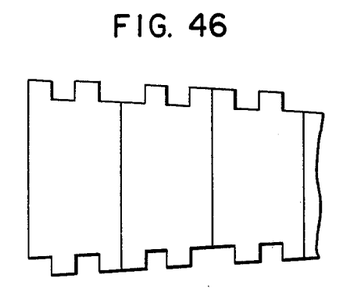
FIGS. 46–48 are plan views of various forms of filter material strip according to the invention.
Figure 47:
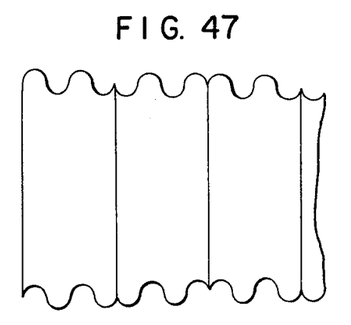
Figure 48:
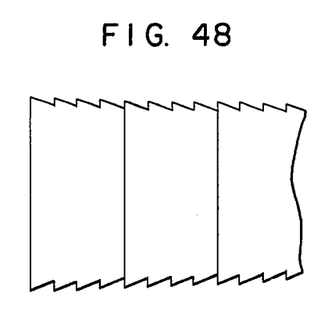

While the projections and depressions are shown as being triangular in shape, the invention is not limited to this specific shape of the projections and depressions and the projections and depressions may be substantially square as shown in FIG. 46 or rounded as shown in FIG. 47. Alternatively, the projections and depressions may be in the form of a serration as shown in FIG. 48. In the latter case, a gap may be formed in the connection but such gap may be filled by using an adhesive agent, to provide an improved connection. Also, projections and depressions may be provided to one side edge of the filter material strip, not to the opposite side edges as have been described. In this case, filling of a gap would be required in the same manner as described by referring to the example shown in FIG. 48.

Figure 49:
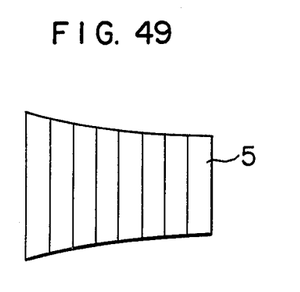
FIGS. 49 and 50 are plan views of other forms of filter material strip according to the invention.
Figure 50:
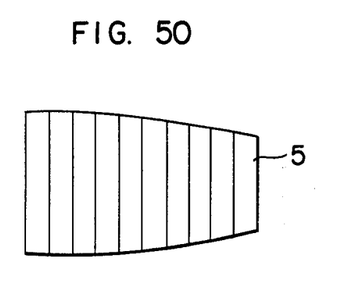
Figure 51:
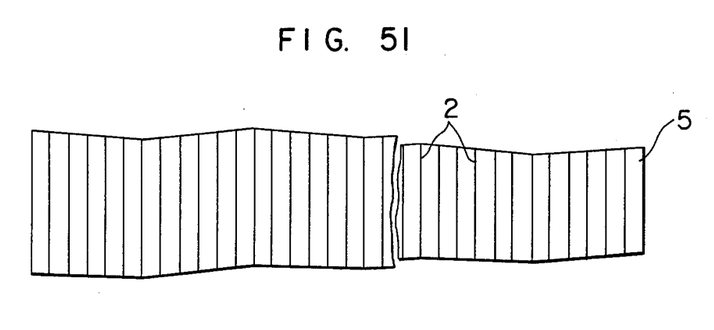
FIG. 51 is a plan view of still another form of filter material strip according to the invention.
Figure 52:
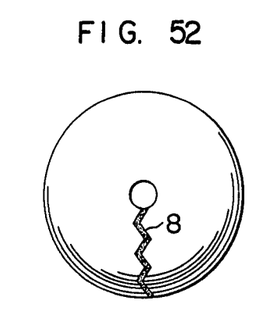
FIG. 52 is a perspective view of the filter material strip shown in FIG. 51, shown in curved condition.

FIGS. 49 and 50 show modifications of the trapezoidal filter material strip according to the invention in which the side edges of the strip 5 is curved inwardly (FIG. 49) and outwardly (FIG. 50) with a small curvature in general. FIG. 51 shows another modification in which projections and depressions each including a plurality of folding lines 2 are formed on opposite side edge of the filter material strip 5. When connected, the connection 8 between the inlet and outlet surfaces of the filter element becomes zigzag as shown in FIG. 52.

In the various forms of filter element shown and described hereinabove the folding lines are spaced apart equidistantly from one another. However, the invention is not limited to this specific form of the filter element and the folding lines in the filter material strip may be spaced apart from one another nonequidistantly.

In addition to various types of adhesive agent, thermal pressure application, any suitable known means, such as thermal pressure application, ultrasonic working, etc., may be used for connecting the opposite side edges of the filter material strip to produce a filter element.

The filter element according to the invention can have many applications, and may be used with an air cleaner system of an internal combustion engine, an air cleaner of an air conditioning system, a lubricant filter system, a fuel oil filter system and a filter system for a fluid in general.

While preferred embodiments of the invention have been described using specific terms, such description is for illustrative purposes only, and it is to be understood that changes and variations may be made without departing from the spirit or scope of the following claims.

What is claimed is:

1. A cylindrical filter element for filtering fluid, having two-dimensional wave forms spreading radially from the axis of said cylindrical element and including a plurality of closed wave crest lines, and being produced through the steps of preparing a filter material strip shaped symmetrical with respect to a center line extending from narrower one end to the wider other end of the strip, of folding said filter strip along a plurality of folding lines substantially perpendicular to the center line to form parallel wave forms between the two ends, and of curving and closing the folded filter strip in such a manner that said narrower end is located on the inner peripheral side of the curved filter strip and said wider end on the outer peripheral side, characterized in that at least one interval between adjacent two of said folding lines is different from at least one of the other intervals, and thus, at least one crest line or bottom line of said two-dimensional wave form is different from at least one of the other crest lines or bottom lines with respect to their heights.

2. A cylindrical filter element as claimed in claim 1, characterized in that said intervals are classified into two groups, one group of shorter regular intervals adjacent to each other and opposing to said narrower end and the other group of longer regular intervals adjacent to each other and opposing to said wider end, so that amplitudes of waves in said two-dimensional wave form are smaller in the radially inside region of said wave form than in the outside region.

3. A cylindrical filter element as claimed in claim 1, characterized in that one of said intervals located substantially at the midportion of said strip is longer than the other intervals of constant length, so that the crests or bottoms of said waves stepwisely vary with respect to their heights substantially at the radial midpoint of said wave form.

4. A cylindrical filter element as claimed in claim 1, characterized in that said intervals are composed of longer intervals and shorter intervals, a longer interval and a shorter interval being arranged alternately, so that the crest lines of said two-dimensional wave form vary with respect to their heights successively with a constant height difference.

5. A cylindrical filter element as claimed in claim 1, characterized in that said filter material strip has a shape of truncated sector, and said narrower and wider ends of the strip and said folding lines have arc-shapes having a common center.

6. A cylindrical filter element as claimed in claim 1, characterized in that said filter material strip has a shape of trapezoid, and said folding lines are straight.

7. A cylindrical filter element as claimed in claim 1, characterized in that said filter material strip has a shape of sector, and said folding lines have arc-shapes having a common center.

* * * * *